United States Patent
Lin et al.

(10) Patent No.: US 11,039,202 B2
(45) Date of Patent: Jun. 15, 2021

(54) HDMI APPARATUS USING OPTICAL COMMUNICATION

(71) Applicant: Artilux, Inc., Menlo Park, CA (US)

(72) Inventors: Shao-Hung Lin, Hsinchu County (TW); Chang-Lin Hsieh, Hsinchu County (TW); Che-Fu Liang, Hsinchu County (TW)

(73) Assignee: Artilux, Inc., Menlo Park, CA (US)

( * ) Notice: Subject to any disclaimer, the term of this patent is extended or adjusted under 35 U.S.C. 154(b) by 0 days.

(21) Appl. No.: 16/862,585

(22) Filed: Apr. 30, 2020

(65) Prior Publication Data
US 2020/0359084 A1    Nov. 12, 2020

Related U.S. Application Data

(60) Provisional application No. 62/844,896, filed on May 8, 2019.

(51) Int. Cl.
*H04N 21/4363* (2011.01)
*H04B 10/69* (2013.01)
*H04B 10/50* (2013.01)
*H04B 10/40* (2013.01)

(52) U.S. Cl.
CPC ....... *H04N 21/43635* (2013.01); *H04B 10/40* (2013.01); *H04B 10/503* (2013.01); *H04B 10/691* (2013.01)

(58) Field of Classification Search
None
See application file for complete search history.

(56) References Cited

U.S. PATENT DOCUMENTS

| | | | |
|---|---|---|---|
| 8,948,197 B2 | 2/2015 | Jiang et al. | |
| 9,641,250 B2 | 5/2017 | Jiang et al. | |
| 9,971,115 B2 | 5/2018 | Jiang et al. | |
| 9,979,479 B2 | 5/2018 | Parekh et al. | |
| 10,754,111 B1* | 8/2020 | Chan | G02B 6/4261 |
| 2006/0077778 A1* | 4/2006 | Tatum | G02B 6/4246 |
| | | | 369/44.11 |
| 2008/0008470 A1* | 1/2008 | Lin | G06F 3/14 |
| | | | 398/66 |

* cited by examiner

*Primary Examiner* — David W Lambert
(74) *Attorney, Agent, or Firm* — Dority & Manning, P.A.

(57) ABSTRACT

A HDMI apparatus is provided. The HDMI apparatus includes a first audio/video transceiver (A/V transceiver) configured to transmit an optical A/V signal to a second A/V transceiver; and a first sideband transceiver configured to drive a first laser diode to transmit a first optical sideband signal including a first control information or a first power information; wherein the first control information or the first power information is converted by a first Serializer/Deserializer (SERDES).

19 Claims, 2 Drawing Sheets

HDMI APPARATUS USING OPTICAL COMMUNICATION

CROSS REFERENCE TO RELATED APPLICATIONS

This patent application claims the benefit of U.S. Provisional Patent Application No. 62/844,896, which was filed on May 8, 2019, and is incorporated herein by reference.

BACKGROUND OF THE INVENTION

1. Field of the Invention

The present application is related to an interface apparatus, and more particularly, to a High-Definition Multimedia Interface (HDMI) apparatus.

2. Description of the Prior Art

High-Definition Multimedia Interface (HDMI) is an audio/video interface for transmitting compressed or uncompressed audio/video data from a source device, such as BD-Player, to a sink device, such as TV. To date, more and more multimedia applications have been developed, that would also stimulate the usage of HDMI. Typically, the signal transmitted in HDMI cable is electrical signal, which may not be easy to make a thinner cable and may cause the signal degradation for a long-distance application. Thus, the present application discloses a full-optical HDMI cable with specific optical channel arrangement and bonding pad arrangement.

SUMMARY OF THE INVENTION

According to an embodiment of the present application, a HDMI apparatus is provided. The HDMI apparatus includes a first Audio/Video transceiver (A/V transceiver) configured to transmit an optical A/V signal to a second A/V transceiver; and a first sideband transceiver configured to drive a first laser diode to transmit a first optical sideband signal including a first control information or a first power information;

wherein the first control information or the first power information is converted by a first Serializer/Deserializer (SERDES).

In a further aspect of the present application, the first sideband transceiver is configured to receive an audio return channel (ARC) signal or an enhanced audio return channel (eARC) signal.

In a further aspect of the present application, the first sideband transceiver comprises a first transmitting pad, a second transmitting pad, a first receiving pad, and a second receiving pad; and the first transmitting pad, the second transmitting pad, the second receiving pad, and the first receiving pad are arranged in order.

In a further aspect of the present application, the first transmitting pad, the first receiving pad, and the second receiving pad are bonded; and the second transmitting pad is unbonded.

In a further aspect of the present application, the HDMI apparatus includes a second sideband transceiver configured to drive a second laser driver to transmit a second optical sideband signal to the first sideband transceiver, wherein the second optical sideband signal includes a second control information or a second power information; wherein the second control information or the second power information is converted by a second SERDES.

In a further aspect of the present application, the second sideband transceiver is configured to drive a third laser driver to transmit a third optical sideband signal; and the third optical sideband signal includes an audio return channel (ARC) signal or an enhanced audio return channel (eARC) signal.

In a further aspect of the present application, the first sideband transceiver and the second sideband transceiver are the same circuitries.

In a further aspect of the present application, the HDMI apparatus includes a first laser driver configured to generate a first driving signal to drive the first laser diode.

In a further aspect of the present application, the first laser diode is a Vertical Cavity Surface Emitting Laser (VCSEL).

In a further aspect of the present application, the first sideband transceiver includes a first photodetector configured to receive a second optical sideband signal; a second photodetector configured to receive a third optical sideband signal; and wherein a first spacing between the first photodetector and the second photodetector is smaller than a second spacing between the second photodetector and the first laser diode.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The foregoing aspects and many of the attendant advantages of this application will become more readily appreciated as the same becomes better understood by reference to the following detailed description, when taken in conjunction with the accompanying drawings, wherein.

DETAILED DESCRIPTION

Figure 1:
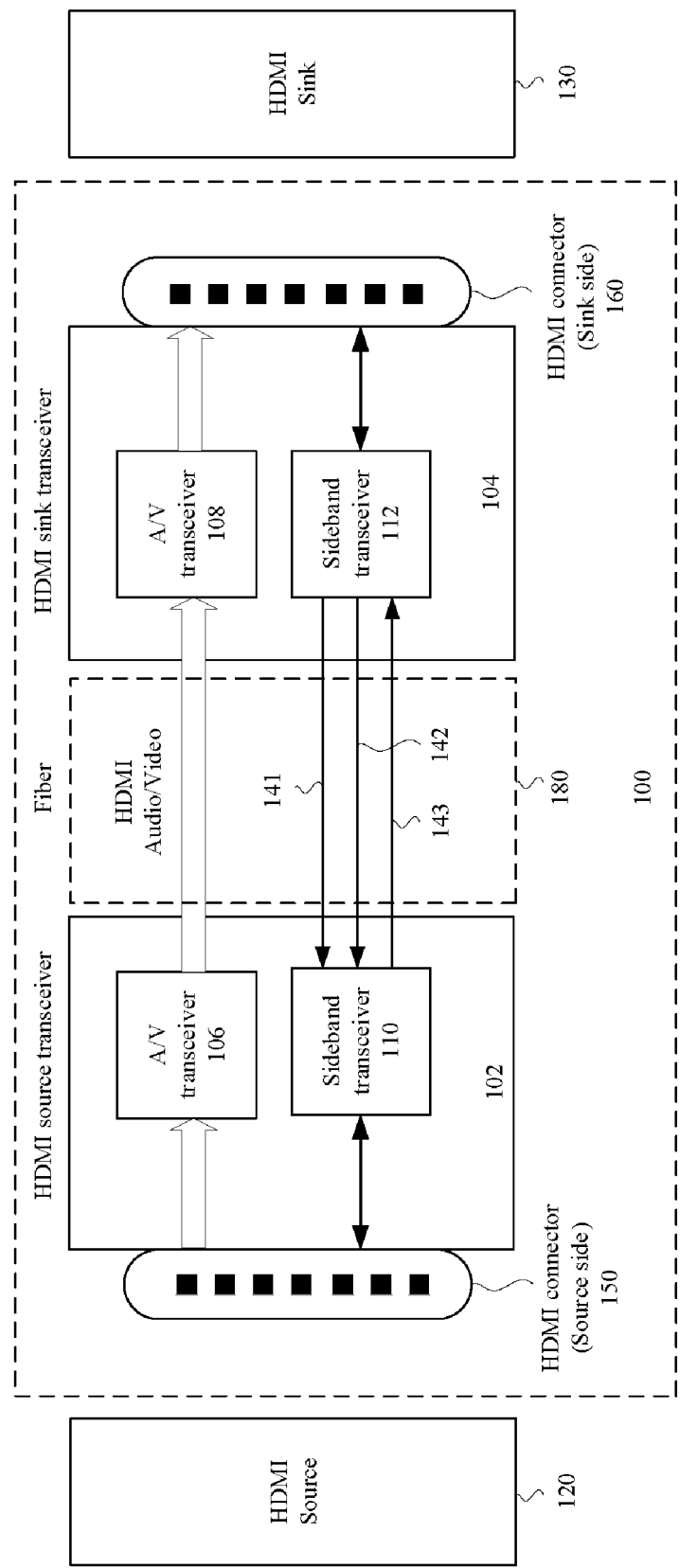
FIG. 1 illustrates a High-Definition Multimedia Interface (HDMI) apparatus, according to some embodiments.

FIG. 1 illustrates a High-Definition Multimedia Interface (HDMI) apparatus 100, according to some embodiments. The HDMI apparatus 100 can be a cable used to connect HDMI source 120 (e.g., BD-player) and HDMI sink 130 (e.g., TV). The HDMI apparatus 100 includes a HDMI source transceiver 102 and a HDMI sink transceiver 104. In one embodiment, the HDMI source transceiver 102 includes an Audio/Video transceiver 106 ("A/V transceiver" hereinafter) and a Sideband transceiver 110; and the HDMI sink transceiver 104 includes an A/V transceiver 108 and a Sideband transceiver 112. The HDMI source transceiver 102 and the HDMI sink transceiver 104 are communicated through optical signals propagated in the fiber 180. The optical signals transmitted between A/V transceiver 106 and A/V transceiver 108 are optical Audio/Video signals. ("optical A/V signals" hereinafter) The optical signals transmitted between Sideband transceiver 110 and Sideband transceiver 112 are optical sideband signals. Furthermore, the HDMI source transceiver 102 and the HDMI sink transceiver 104 are respectively coupled to the HDMI connector 150 and HDMI connector 160. There are many pins in the HDMI source transceiver 102 and the HDMI sink transceiver 104, the details will be described hereinbelow.

In one embodiment, A/V transceiver 106 uses three/four optical channels to transmit optical A/V signals to A/V transceiver 108, where the optical A/V signals transmitted on these three/four optical channels are Transition Minimized Differential Signaling (TMDS) formats.

In one embodiment, A/V transceiver 106 uses three/four optical channels to transmit optical A/V signals to A/V transceiver 108, where the optical A/V signals transmitted on these three/four optical channels are 16B18B Fix Rate Link (FRL) formats.

In one embodiment, the Sideband transceiver 110 and the Sideband transceiver 112 use three optical channels to communicate to each other. An optical channel 141 is configured to transmit a control information and/or power information generated from Sideband transceiver 112 to the Sideband transceiver 110. An optical channel 142 is configured to transmit an Audio Return Channel (ARC) signal or an Enhanced Audio Return Channel (eARC) signal from the Sideband transceiver 112 to the Sideband transceiver 110. An optical channel 143 is configured to transmit a control information and/or power information generated from Sideband transceiver 110 to the Sideband transceiver 112. As mentioned before, the control information and/or power information transmitted on the optical channel 141, the ARC/eARC signals transmitted on the optical chancel 142 and the control information and/or power information transmitted on the optical channel 143 are sideband signals.

In one embodiment, the Sideband transceiver 110 and the Sideband transceiver 112 are configured to perform handshake protocol through optical channel 141 and optical channel 143.

In one embodiment, the maximum data rate of each optical A/V signal is three times more than the data rate of each optical sideband signal.

In one embodiment, the optical channel 142 configured to transmit ARC signal or an Enhanced Audio Return Channel (eARC) signal can be removed. In other words, this optical channel 142 is optional.

In one embodiment, the A/V transceiver 106 and the Sideband transceiver 110 can be integrated into a single chip or be separated into two chips or more. Similarly, the A/V transceiver 108 and the Sideband transceiver 112 can be integrated into a single chip or be separated into two chips or more.

Figure 2:
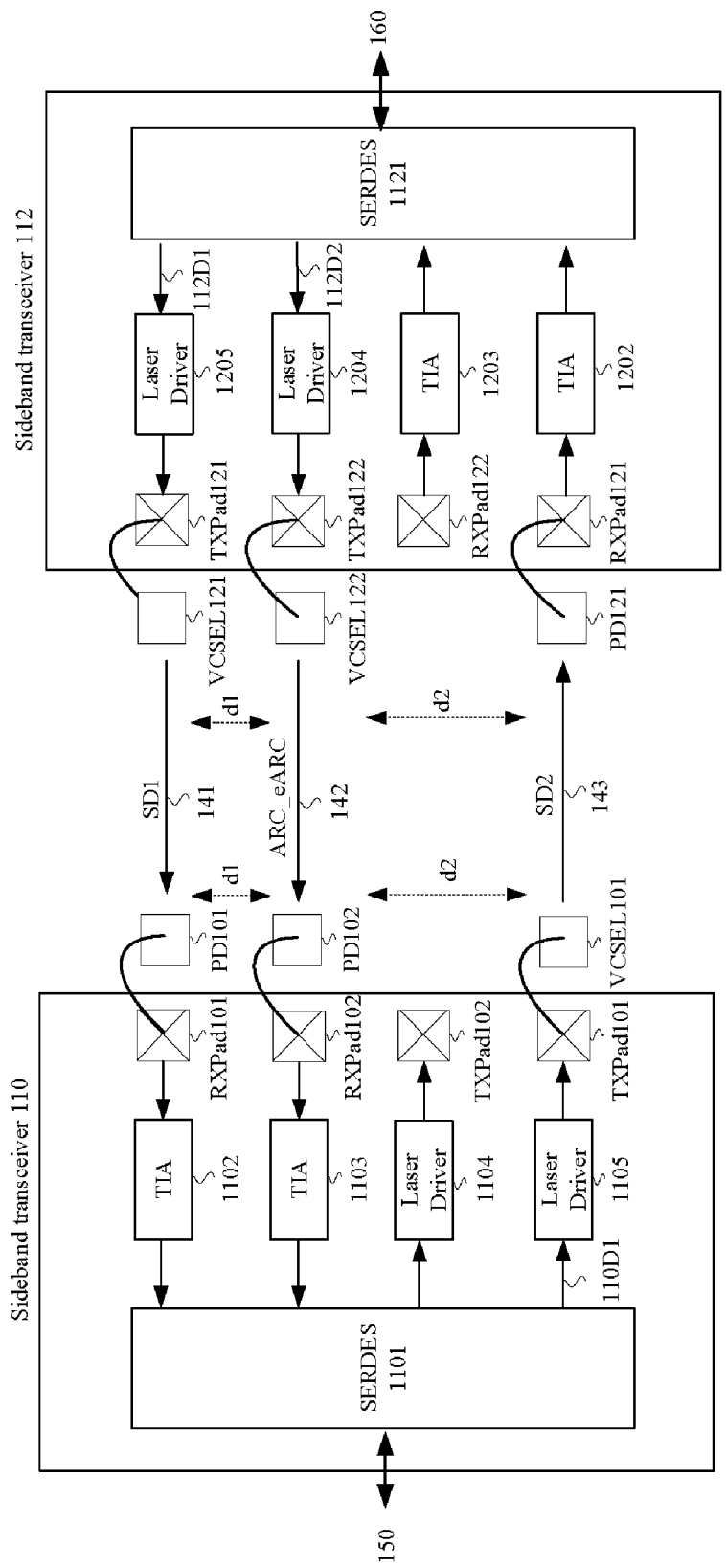
FIG. 2 illustrates a data path of a Sideband transceiver and a Sideband transceiver, according to some embodiments.

FIG. 2 illustrates the data path of Sideband transceiver 110 and the Sideband transceiver 112, according to some embodiments.

As known in the art, HDMI has many versions (e.g., HDMI 1.0, HDMI 1.2, HDMI 1.4, HDMI 2.0 and HDMI 2.1), different version may have different pin counts and functionalities. Part of HDMI pins will be mentioned and how it works with present application will be described below.

In one embodiment, the Sideband transceiver 110 includes a Serializer/Deserializer (SERDES) 1101 configured to convert the control/power signals of CEC (Pin13), Utility (Pin14), SCL (Pin15), SDA (Pin16), Power (Pin 18) and/or HPD (Pin19) of HDMI connector 150 into a serial data stream 110D1 as a sideband signal. This serial data stream 110D1 includes control information and/or power information, and will be converted into an optical sideband signal SD2 on the optical channel 143 by a laser driver 1105 and a laser diode VCSEL101. The laser driver 1105 is configured to generate a driving signal to the laser diode VCSEL101 so that the laser diode VCSEL101 can generate the optical sideband signal SD2 according to the driving signal.

In one embodiment, the Sideband transceiver 110 includes transmitting pad TXPad101, transmitting pad TXPad102, receiving pad RXPad101 and receiving pad RXPad102, where transmitting pad TXPad101 is bonded to the laser diode VCSEL101, transmitting pad TXPad10_2 is unbonded, receiving pad RXPad101 is boned to a photodetector PD101 and receiving pad RXPad102 is boned to a photodetector PD102. As illustrated in FIG. 2, the order of these four pads is transmitter-transmitter-receiver-receiver. Additional pads (e.g., power pads) can be arranged in-between any two of this four pads.

In one embodiment, the Sideband transceiver 112 includes a SERDES 1121 configured to convert the audio/control/power signals of CEC (Pin13), Utility (Pin14), SCL (Pin15), SDA (Pin16), Power (Pin 18) and/or HPD (Pin19) of HDMI connector 160 into two serial data streams as sideband signals.

The first serial data stream 112D1 includes control information and/or power information related to CEC (Pin13), Utility (Pin14), SCL (Pin15), SDA (Pin16), Power (Pin 18) and/or HPD (Pin19) of HDMI connector 160. The first serial data stream 112D1 will be converted into an optical sideband signal SD1 on the optical channel 141 by a laser driver 1205 and a laser diode VCSEL121. The laser driver 1205 is configured to generate a driving signal to the laser diode VCSEL121 so that the laser diode VCSEL121 can generate the optical sideband signal SD1 according to the driving signal.

The second serial data stream 112D2 includes audio information related to Utility (Pin14) and HPD (Pin19) of HDMI connector 160. Specifically, the second serial data stream 112D2 is an audio signal (e.g., ARC/eARC signal) which is retrieved from a differential mode signal carried on the Utility (Pin14) and HPD (Pin19), or a single ended mode signal carried on the Utility (Pin14). The second serial data stream 112D2 will be converted into an optical sideband signal ARC_eARC on the optical channel 142 by a laser driver 1204 and a laser diode VCSEL122. The laser driver 1204 is configured to generate a driving signal to the laser diode VCSEL122 so that the laser diode VCSEL122 can generate the optical sideband signal ARC_eARC according to the driving signal.

In one embodiment, as illustrated in FIG. 2, the optical channel 142 is arranged in-between the optical channel 141 and optical channel 143, where the optical channel 142 is configured to transmit audio-related signal; and the optical channel 141 and optical channel 143 are configured to transmit control/power-related signals.

In one embodiment, the Sideband transceiver 112 includes transmitting pad TXPad121, transmitting pad TXPad122, receiving pad RXPad121 and receiving pad RXPad122, where transmitting pad TXPad121 is bonded to an laser diode VCSEL121, transmitting pad TXPad122 is bounded to laser diode VCSEL122, receiving pad RXPad121 is bonded to a photodetector PD121 and receiving pad RXPad122 is unbonded. The order of these four pads is also transmitter-transmitter-receiver-receiver. Additional pads (e.g., power pads) can be arranged in-between any two of this four pads.

As illustrated in FIG. 2, the Sideband transceiver 110 and Sideband transceiver 112 includes transimpedance amplifiers 1102, 1103, 1202 and 1203, where transimpedance amplifiers 1102, 1103, 1202 are configured to receive the signals generated by photodetectors PD101, PD102, PD121 respectively.

According to different design requirements, some elements (e.g., laser driver 1104 and transimpedance amplifier 1203) implemented in the Sideband transceiver 110 and Sideband transceiver 112 may be used or not be used. As the embodiment shown in FIG. 2, only three optical channels 141, 142 and 143 are use, the laser driver 1104 and the transimpedance amplifier 1203 will not be used. In another embodiment, if optical channel 142 for transmitting audio-related signal (ARC/eARC signal) is removed, the laser driver 1204 and the transimpedance amplifier 1103 will not be used as well.

In one embodiment, the positions of these four pads RXPad101, RXPad102, TXPad102 and TXPad101 can be well-arranged so that the Sideband transceiver 110 and the Sideband transceiver 112 can be implemented by the same chips. In one implementation, as illustrated in FIG. 2, when the order of these four pads RXPad101, RXPad102, TXPad102 and TXPad101 is arranged as transmitter-transmitter-receiver-receiver (collectively "TTRR"), and the spacing (e.g., the spacing is d1) between pads RXPad101 and RXPad102 and the spacing (e.g., the spacing is d1) between pads TXPad102 and TXPad101 are the same, the Sideband transceiver 112 can be implemented by the same of Sideband transceiver 110. More specifically, the Sideband transceiver 112 is Sideband transceiver 110 with 180-degree rotation. With this arrangement, same circuitries can be used as Sideband transceiver 110 and Sideband transceiver 112, which lower the dicing/picking/testing efforts and save the cost.

In one embodiment, the spacing d1 between photodetectors PD101 and PD102 (or the spacing d1 between laser diodes VCSEL121 and VCSEL122) and the spacing d2 between photodetector PD102 and laser diode VCSEL101 (or the spacing d2 between photodetector PD121 and laser diode VCSEL122) can be designed as the same or be different. In one embodiment, the spacing d1 is smaller than the spacing d2. In one embodiment, the spacing d1 and spacing d2 can be designed with lens minimum pitch (e.g., 500 um).

In one embodiment, the photodetector PD101, the photodetector PD102 and the laser diode VCSEL101 may be integrated into the Sideband transceiver 110. Similarly, the photodetector PD121, the laser diode VCSEL122 and the laser diode VCSEL121 may be integrated into the Sideband transceiver 112.

In one embodiment, the data rates of optical sideband signals SD1 and SD2 are higher than the data rate of optical sideband signal ARC_eARC. In one implementation, the data rates of optical sideband signals SD1 and SD2 can be ranged from 1 Gbps-2 Gbps, and the maximum data rate of the optical sideband signal ARC_eARC. can be 100 Mbps.

In accordance with the foregoing embodiments, this application implements a full-optical HDMI cable, where the A/V signal is transmitted using optical signal and sideband signal (e.g., SCL/SDA/CEC/PWR5V/HPD/UTILITY/ARC/e_ARC) is also transmitted using optical signal. The full-optical HDMI cable can not only reduce the signal loading, but also reduce the thickness of the HDMI cable (compared to traditional HDMI cable using copper).

On the other hands, this application well arranges the positions of optical channels and pads, such that the Sideband transceiver in source side and Sideband transceiver in sink side can be the same circuitries, which lower the dicing/picking/testing efforts and save the cost.

For ARC/eARC-free applications, ARC/eARC audio channel can be disabled/removed to save module cost and power consumption. It provides the alternatives to module maker and keep the flexibility of product development.

In addition, the photodetector/laser diode spacing can be designed with minimum pitch, which may reduce the total area.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A High-Definition Multimedia Interface (HDMI) apparatus, comprising:
 a first audio/video transceiver configured to transmit an optical audio/video signal to a second audio/video transceiver; and
 a first sideband transceiver configured to drive a first laser diode to transmit a first optical sideband signal including a first control information or a first power information;
 wherein the first control information or the first power information is converted by a first Serializer/Deserializer (SERDES);
 wherein the first sideband transceiver comprises a first transmitting pad, a second transmitting pad, a first receiving pad, and a second receiving pad;
 wherein the first transmitting pad, the first receiving pad, and the second receiving pad are each bonded to a respective laser diode or photodetector; and
 wherein the second transmitting pad is unbonded.

2. The HDMI apparatus of claim 1, wherein the first sideband transceiver is configured to receive an audio return channel signal.

3. The HDMI apparatus of claim 1, wherein the first transmitting pad, the second transmitting pad, the second receiving pad, and the first receiving pad are arranged in order.

4. The HDMI apparatus of claim 1, further comprising:
 a second sideband transceiver configured to drive a second laser diode to transmit a second optical sideband signal to the first sideband transceiver, wherein the second optical sideband signal includes a second control information or a second power information;
 wherein the second control information or the second power information is converted by a second SERDES.

5. The HDMI apparatus of claim 4, wherein the second sideband transceiver is configured to drive a third laser diode to transmit a third optical sideband signal; and the third optical sideband signal includes an audio return channel signal.

6. The HDMI apparatus of claim 4, wherein the first sideband transceiver and the second sideband transceiver are the same circuitries.

7. The HDMI apparatus of claim 1, further comprises a first laser driver configured to generate a first driving signal to drive the first laser diode.

8. The HDMI apparatus of claim 1, wherein the first laser diode is a Vertical Cavity Surface Emitting Laser (VCSEL).

9. The HDMI apparatus of claim 1, wherein the first sideband transceiver further comprises:

a first photodetector configured to receive a second optical sideband signal; and a second photodetector configured to receive a third optical sideband signal;

wherein a first spacing between the first photodetector and the second photodetector is smaller than a second spacing between the second photodetector and the first laser diode.

10. A High-Definition Multimedia Interface (HDMI) apparatus, comprising:
a first audio/video transceiver configured to transmit an optical audio/video signal to a second audio/video transceiver; and
a first sideband transceiver configured to drive a first laser diode to transmit a first optical sideband signal including a first control information or a first power information;
wherein the first control information or the first power information is converted by a first Serializer/Deserializer (SERDES);
wherein the first sideband transceiver further comprises:
a first photodetector configured to receive a second optical sideband signal; and
a second photodetector configured to receive a third optical sideband signal, and
wherein a first spacing between the first photodetector and the second photodetector is smaller than a second spacing between the second photodetector and the first laser diode.

11. The HDMI apparatus of claim 10, wherein the first sideband transceiver is configured to receive an audio return channel signal.

12. The HDMI apparatus of claim 10, further comprising:
a second sideband transceiver configured to drive a second laser diode to transmit a second optical sideband signal to the first sideband transceiver, wherein the second optical sideband signal includes a second control information or a second power information;
wherein the second control information or the second power information is converted by a second SERDES.

13. The HDMI apparatus of claim 12, wherein the second sideband transceiver is configured to drive a third laser diode to transmit a third optical sideband signal; and the third optical sideband signal includes an audio return channel signal.

14. The HDMI apparatus of claim 12, wherein the first sideband transceiver and the second sideband transceiver are the same circuitries.

15. The HDMI apparatus of claim 10, further comprises a first laser driver configured to generate a first driving signal to drive the first laser diode.

16. The HDMI apparatus of claim 10, wherein the first laser diode is a Vertical Cavity Surface Emitting Laser (VCSEL).

17. A High-Definition Multimedia Interface (HDMI) apparatus, comprising:
an audio/video transceiver at a sink side, configured to receive an optical audio/video signal from an audio/video transceiver at a source side; and
a sideband transceiver at the sink side, configured to transmit a first optical sideband signal including a first control information or a first power information to the source side,
wherein the first control information or the first power information is converted by a Serializer/Deserializer (SERDES) at the sink side,
wherein the sideband transceiver at the sink side further comprises a first transmitting pad, a second transmitting pad, a first receiving pad, and a second receiving pad; and,
wherein the first transmitting pad, the second transmitting pad, and the second receiving pad are bonded; and the first receiving pad is unbonded.

18. The HDMI apparatus of claim 17, wherein the sideband transceiver at the sink side is configured to transmit a second optical sideband signal.

19. The HDMI apparatus of claim 18, wherein the second optical sideband signal is an audio return channel signal.

* * * * *